Sept. 3, 1968  TAKESHI HOJO ET AL  3,399,879
SHOCK PREVENTIVE MEANS FOR NAUTICAL METERS
Filed Feb. 16, 1966  2 Sheets-Sheet 1
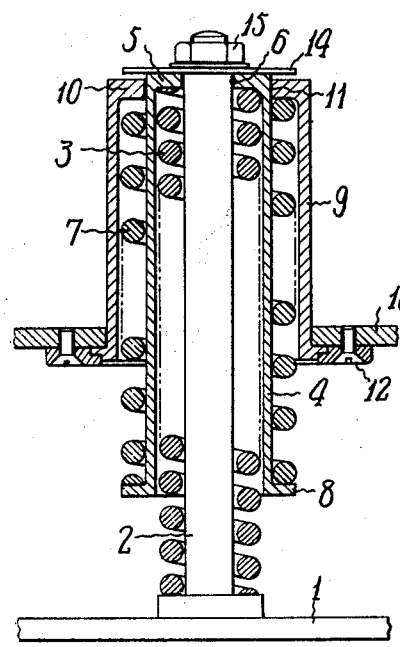
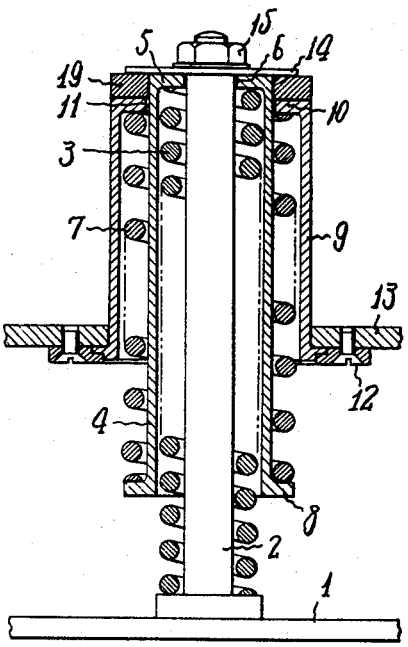
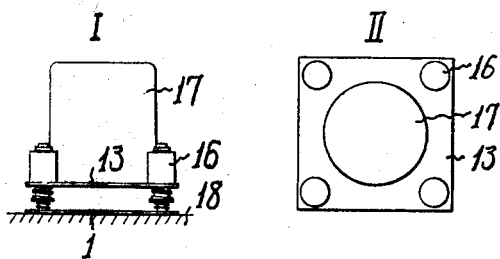
INVENTORS.
TAKESHI HOJO, MICHIO FUKANO,
TETSUNO TANABE.
BY
ATTORNEY.

United States Patent Office 3,399,879
Patented Sept. 3, 1968

3,399,879
SHOCK PREVENTIVE MEANS FOR
NAUTICAL METERS
Takeshi Hojo, Tokyo, and Michio Fukano and Tetsuo
Tanabe, Yokohama, Japan, assignors to Tokyo Keiki
Seizosho Co., Ltd., Tokyo, Japan
Filed Feb. 16, 1966, Ser. No. 527,694
Claims priority, application Japan, Feb. 20, 1965,
40/13,095, 40/13,096
5 Claims. (Cl. 267—1)

ABSTRACT OF THE DISCLOSURE

At least two coil springs are concentrically disposed and connected with each other in series. One of the springs is adapted to be given a preload. A further spring of non-linear spring constant is included in the series. Caps of both coil springs deflect to a lower foundation at the same time.

Field of the invention

This invention relates to shock preventive means for nautical meters.

Background of the invention

In general it is necessary that the shock preventive seat for nautical meters act to guard against various impacts imparted to the meters on a ship at sea due to the rolling waves or other causes and simultaneously that it not remain in resonance with the number of revolutions of the main engine and other steady vibrations.

When a spring is used for such a purpose, it is preferably such as is capable of absorbing the impacts gradually in the longest possible stroke thereof, namely, a soft spring is preferred on one hand. On the other hand, however, a hard spring is desirable in dealing with the above-mentioned latter case, i.e. against resonance with steady vibrations.

The number of revolutions of a nautical engine differs, depending on the size of ship or kind of engine. For example, in the case of a ship over 100 tons for a so-called pelagic voyage, the number of revolutions of the main engine remains between 100 and 400 r.p.m. Therefore, in heavy meters such as a gyro-compass or the like, the resonance point of shock preventive means must be sought outside the ranges of 100 and 400 r.p.m.

However, the provision for a resonance point below 100 r.p.m. is next to impossible from a technical point of view and, moreover, there is no alternative other than over 400 r.p.m. in practice. The softest possible spring is desirable in protecting the meter from impacts caused by waves or other factors while the hardest possible spring is desired to protect it from steady vibrations due to the revolution of the main engine and other such factors.

Summary of the invention

The main object of the present invention is to provide shock preventive means, extremely economical and durable, which is capable of causing the above-mentioned mutually counteracting functions to be effected satisfactorily at one time.

Other objects of the present invention will be self-explanatory from various embodiments shown hereinafter with reference to the accompanying drawings in which like reference numerals designate like parts throughout the figures thereof.

Brief description of the drawing

FIG. 1 is a vertical section of an embodiment of the present invention.

FIG. 2 shows the invention supporting a meter. FIG. 2(I) is a side view. FIG. 2(II) is a plan view.

FIG. 4 is a vertical section of another embodiment according to the present invention.

Description of the preferred embodiments

Figure 3:
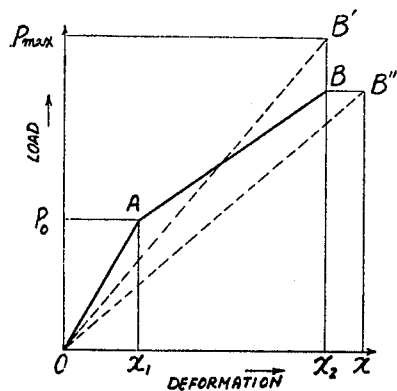
FIG. 3 is a diagrammatical view to show load-deformation curves of shock preventive means of the above-mentioned embodiment and conventional means of prior art.

In FIG. 1, reference 1 is a lower base plate which is fixed as part of the hull of a ship. A guide bar 2 is vertically fixed to the surface of said lower base plate 1.

A second coil spring 3 is inserted onto said guide bar 2, and said spring is capped with a cylindrical inner holder 4.

A hole 6 is formed in the top portion 5 of said inner holder 4 in which said guide bar 2 is inserted and the top portion 5 remains in engagement with the coil spring 3. In this manner, the inner holder 4 can vibrate up and down along the guide bar 2. A first coil spring 7 is disposed outwardly of the inner holder 4 and supported by a flange 8 formed at the lower part of inner holder 4. Said first coil spring is capped with an external holder 9. A hole 11 is formed in the top portion 10 of said external holder 9 and the inner holder 4 is inserted in the hole 11, the top portion 10 remaining in engagement with the coil spring 7. The external holder 9 is combined with an upper base plate 13 by means of a check plate 12. Thus both upper plate 13 and external holder 9 integral therewith are enabled to vibrate up and down along the inner holder 4.

Furthermore, a control plate 14 is inserted onto the head of guide bar 2 extending upwardly through the hole 6 in the top portion 5 of inner holder 4 and a nut 15 is threaded onto said head.

Thus it is made possible to fasten the second coil spring 3 by means of said control plate 14 and nut 15 until a predetermined load is reached. In FIG. 2, reference 16 is the shock preventive device of the present invention. The device is installed at each of four places between the lower base plate 1 and the upper base plate 13, a meter 17 being mounted on the upper base plate 13 and the lower base plate 1 being fixed to the body 18 of a ship by means of bolts or the like. In this manner, the meter 17 can be set on the ship through the shock preventive means of the present invention.

The operation of the present means will be explained with reference to the load-deformation curve shown in FIG. 3.

In the drawing, $P_0$ shows a preload which has been added to the second coil spring 3 by means of the nut 15 and control plate 14 under non-load conditions.

When a load is added to the upper base plate 13 in this state and it is less than said preload $P_0$, the first coil spring 7 only may work as a hard spring. When such deformation reaches $X_1$, the load on the first coil spring 7 amounts to said preload $P_0$ and thereafter both coil springs 3 and 7 are compressed at one time so that they may work as a soft spring.

Supposing the spring constant of the first coil 7 to be $K_1$ and that of the second coil to be $K_2$ respectively, the spring constant between 0 and $X_1$ is $K_1$ and that between $X_1$ and $X_2$ is $$\frac{K_1 \cdot K_2}{K_1 + K_2}$$

By this means, steady vibrations due to the main engine or the like can be absorbed by the spring of spring constant $K_1$ (i.e., a hard spring) and large vibrations of the ship due to the rolling waves can be absorbed by the spring of spring constant $$\frac{K_1 \cdot K_2}{K_1 + K_2}$$

(i.e., a hard spring). According to the FIG. 1 embodiment of the present invention, the first coil spring 7 and the second coil spring 3 are arranged concentrically by means of two holders, as shown in the drawing. When the inner holder 4 strikes the lower base plate 1, the upper base plate 13 strikes the latter. As shown in FIG. 1, this is made possible by making the internal diameter of the external holder greater than the outer diameter of the flange 8. Because of this arrangement, a sufficient stroke can be obtained in a minimal spacing. In comparison with conventional shock preventive means using the first coil spring 7 alone, the shock-preventive device of the present invention insures a larger absorbed energy for the same stroke. Moreover, because of a smaller spring constant at larger deformation as mentioned above, it is possible to accommodate an accelerating speed in the ship body within meter allowance limits satisfactorily. Furthermore, in case a small coil spring is technically available or there is a spacing allowance, the external diameters of both coil springs may be made the same and then they may be overlapped so that the same effects as above can be achieved.

The straight lines OB' and OB'' represent load-deformation curves of simple pull springs of prior art.

In comparing these straight lines with those of the above-mentioned embodiments of the present invention, and in the case of attempting to obtain the absorbed energy of the present invention (the area surrounded by O–A–B–$X_2$ of FIG. 3 shows the quantitative amount thereof) by any conventional means of prior art, it is necessary to increase the maximal load $P_{max}$ as shown by straight line OB' of FIG. 3 or increase the stroke as shown by straight line OB''.

In the case of increasing the maximal load, a larger degree of acceleration will act on a meter mounted on the device and, in the case of increasing the stroke, the shock preventive device itself cannot but be bulky in construction.

In either case, a serious drawback may be encountered for use as a shock-preventive seat for nautical meters, whereas there is none of such shortcoming in the present device.

With reference to another embodiment of the present invention as shown in FIG. 4, there is provided additionally a felt ring 19 between the top portion 10 of external holder 9 and the control plate 14. Otherwise, the embodiments of FIGS. 1 and 4 are exactly the same.

A compass or nautical meter 17 is connected to the upper base plate 13.

Figure 5:
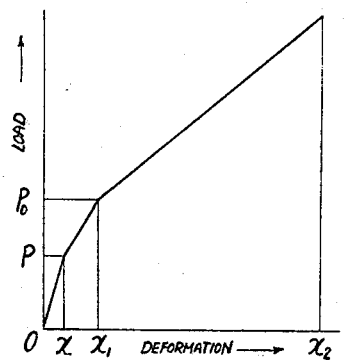
FIG. 5 is a graph showing load-deformation characteristics of shock preventive means of the above embodiment.

Under these conditions, the preload $P_0$ is added to the second coil spring 3 by means of the nut 15 and control plate 14 and at the same time a preload corresponding to P in FIG. 5 is added to the first coil spring 7 by means of the nut 15, control plate 14 and felt ring 19, and therefore, the preload P is added to the felt 19 too.

Figure 7:
FIG. 7 is an explanatory view of the abovementioned embodiment.

Now referring to the procedure of a small degree of load-deformation by this shock-preventive means, the second coil spring 3 does not work below the preload $P_0$ so that springy action can be effected by means of the felt 19 and the first coil spring 7 only. Consequently in this case, this mechanism is regarded as a springy mechanism like that consisting of the felt 19 and the first coil spring 7 as shown in FIG. 7.

This mechanism acts to absorb steady and small vibrations. In FIG. 7, $k_0$ represents an approximate spring constant of the felt and $k_1$ is the spring constant of the first coil spring 7. Again in the same drawing, a meter (for example, a compass) is fixed at a—a to the upper base plate 13, which is then kept in a balanced position by receiving the opposing forces P from the felt 19 and the first coil spring 7. When a—a is moved by $x$ in the direction of the arrow, its restoring force will be represented by the following equation.

$$F = k_1 x + k_0 x = (k_1 + k_0) x$$

Supposing the spring constant of this system to be K, the following equation results.

$$K = F/x = k_1 + k_0$$

Namely, the spring constant at a slight degree of deformation is increased so that a so-called hard spring is obtained.

FIG. 5 shows that the spring constant between 0 and $x$ corresponds to $(k_1 + k_0)$, that between $x$ and $x_1$ to $(k_1)$, and that between $x_1$ and $x_2$ to $$\frac{k_1 \cdot k_2}{k_1 + k_2}$$

respectively.

When adding a load to the upper base plate 13 under these conditions, and in the case of the load being less than the preload P, the device will work with the spring constant $k_1 + k_0$. In the case of loads exceeding P, the coil spring with the spring constant $K_1$ will act and in the case of the load exceeding $P_0$, the device will work with the spring constant, $$\frac{k_1 \cdot k_2}{k_1 + k_2}$$

Figure 6:
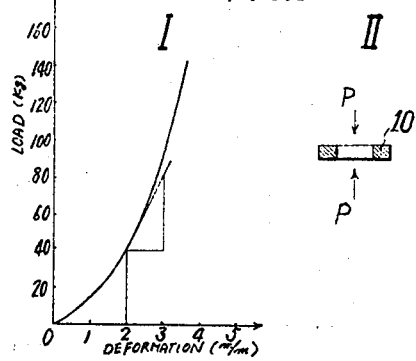
FIG. 6(I) is a graph showing the compressive characteristics of a felt as specified in FIG. 6(II).

FIG. 6(I) shows a compressive curve of a felt spring, 10 mm. thick, 40 mm. in internal diameter and 70 mm. in external diameter.

As is seen in the drawing, the slope of the curve becomes sharper as the degree of deformation is increased, namely, the spring constant becomes larger.

This definition may not always be restricted to a felt material but may also apply to a resilient body with a nonlinear spring constant. When using a resilient body with this kind of nonlinear spring constant, it is made possible to obtain almost any arbitrary spring constant very easily and economically, though within small limits, by changing the preload $P_0$. In order to design shock-preventive means for nautical meters, it is desirable to make the spring constant $k_1$ of the first coil spring and $k_2$ of the second coil spring those of sufficiently soft springs and to utilize a suitable preload on the springs to avoid resonance with the rotating plate of the main engine, for example, by compressing a felt material so that a large spring constant can be obtained within small limits of load deformation so that resonance with external vibrations is prevented sufficiently by increasing the resonance frequency.

In the present specification, this compressive material has been adopted in the form of a felt material but it is obvious that any suitable kind of resilient body can also be used as an alternative and moreover, any coil spring, dish spring or other metal springs will also do provided that they are specifically designed to insure suitable conditions.

What is claimed is:

1. Shock preventive seat for mounting a nautical meter to the hull of a ship, comprising: a second coil spring (3); means to mount the second coil spring at its lower end upright against a hull; an inner holder (4) capping the second coil spring and having a top portion (5) engaging against the upper end of the second coil spring; a first coil spring (7) disposed outwardly of said inner holder and supported at its lower end against a flange (8) at the lower part of the inner holder; an external holder (9) capping the first coil spring and having a top portion (10) engaging against the upper end of the first coil spring; and means to attach a nautical meter to the external holder above its lower end; said external holder being deflectable against the hull; said internal holder being deflectable against the hull and just reaching the hull when the external holder does.

2. Shock preventive seat as claimed in claim 1, further comprising means to preload at least one of said coil springs.

3. Shock preventive seat for mounting a nautical meter to the hull of a ship, comprising: a second coil spring (3); means to mount the second coil spring at its lower end upright against a hull; an inner holder (4) capping the second coil spring and having a top portion (5) engaging against the upper end of the second coil spring; a first coil spring (7) disposed outwardly of said inner holder and supported at its lower end against a flange (8) at the lower part of the inner holder; an external holder (9) capping the first coil spring and having a top portion (10) engaging against the upper end of the first coil spring; means to attach a nautical meter to the external holder above its lower end; a resilient body (19) with a non-linear spring constant disposed at the top of said external holder; and means for giving a preload to said resilient body and to said first coil spring.

4. Shock preventive seat as claimed in claim 3, further comprising means to give preload to said second coil spring.

5. Shock preventive seat as claimed in claim 3, said external holder being deflectable against the hull, said internal holder being deflectable against the hull and just reaching the hull when the external holder does.

References Cited
UNITED STATES PATENTS 1,404,464   1/1922   Meyer _____ 267—61

ARTHUR L. LA POINT, *Primary Examiner.*

R. M. WOHLFARTH, *Assistant Examiner.*